United States Patent [19]

Coulthard

[11] Patent Number: 4,745,884

[45] Date of Patent: May 24, 1988

[54] FLUIDIZED BED STEAM GENERATING SYSTEM

[75] Inventor: E. James Coulthard, Leicester, Mass.

[73] Assignee: Riley Stoker Corporation, Worcester, Mass.

[21] Appl. No.: 55,173

[22] Filed: May 28, 1987

[51] Int. Cl.$^4$ .............................................. F22B 1/00
[52] U.S. Cl. ................................... 122/4 D; 110/245; 110/263; 431/170
[58] Field of Search ............... 122/4 D; 110/245, 263; 431/170, 7; 165/104.16

[56] References Cited

U.S. PATENT DOCUMENTS

| 4,454,838 | 6/1984 | Strohmeyer, Jr. | 122/4 D |
| 4,469,050 | 9/1984 | Korenberg | 122/4 D |

*Primary Examiner*—Henry A. Bennet
*Attorney, Agent, or Firm*—Mason, Kolehmainen, Rathburn & Wyss

[57] ABSTRACT

A fluidized bed steam generating system includes an upstanding combustion vessel, a gas/solids separator, a convection pass boiler and a heat exchanger positioned directly below the boiler and all of the above elements except the gas/solids separator are enclosed within a waterwall structure having outside waterwalls and a central waterwall common to the reactor vessel on one hand and the convection pass boiler and heat exchanger on the other hand. The close proximity of the components of the system eliminate numerous problems present in conventional multi-solid fluidized bed steam generators.

30 Claims, 4 Drawing Sheets

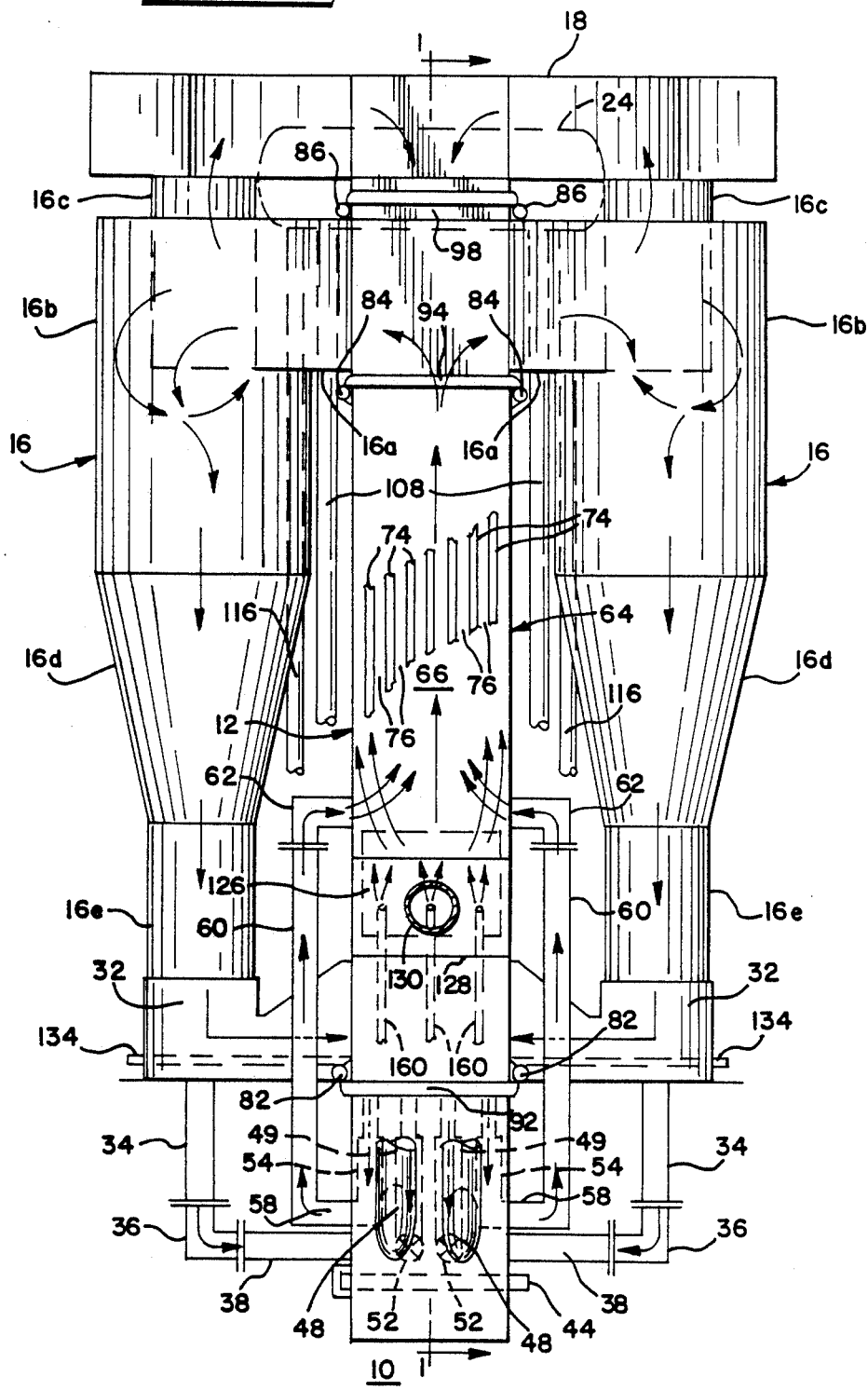

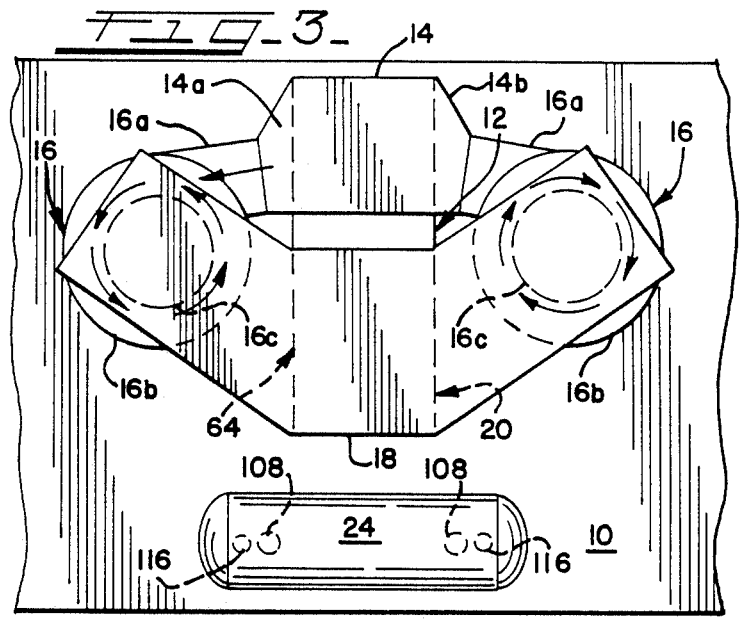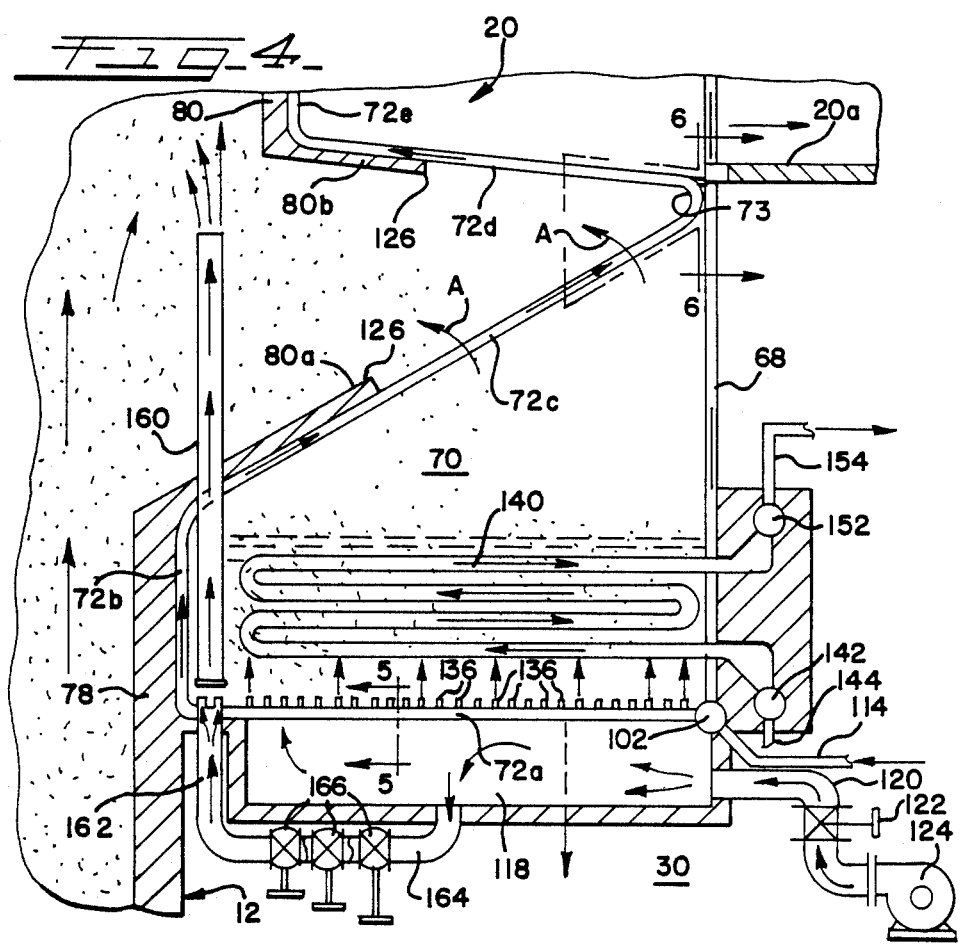

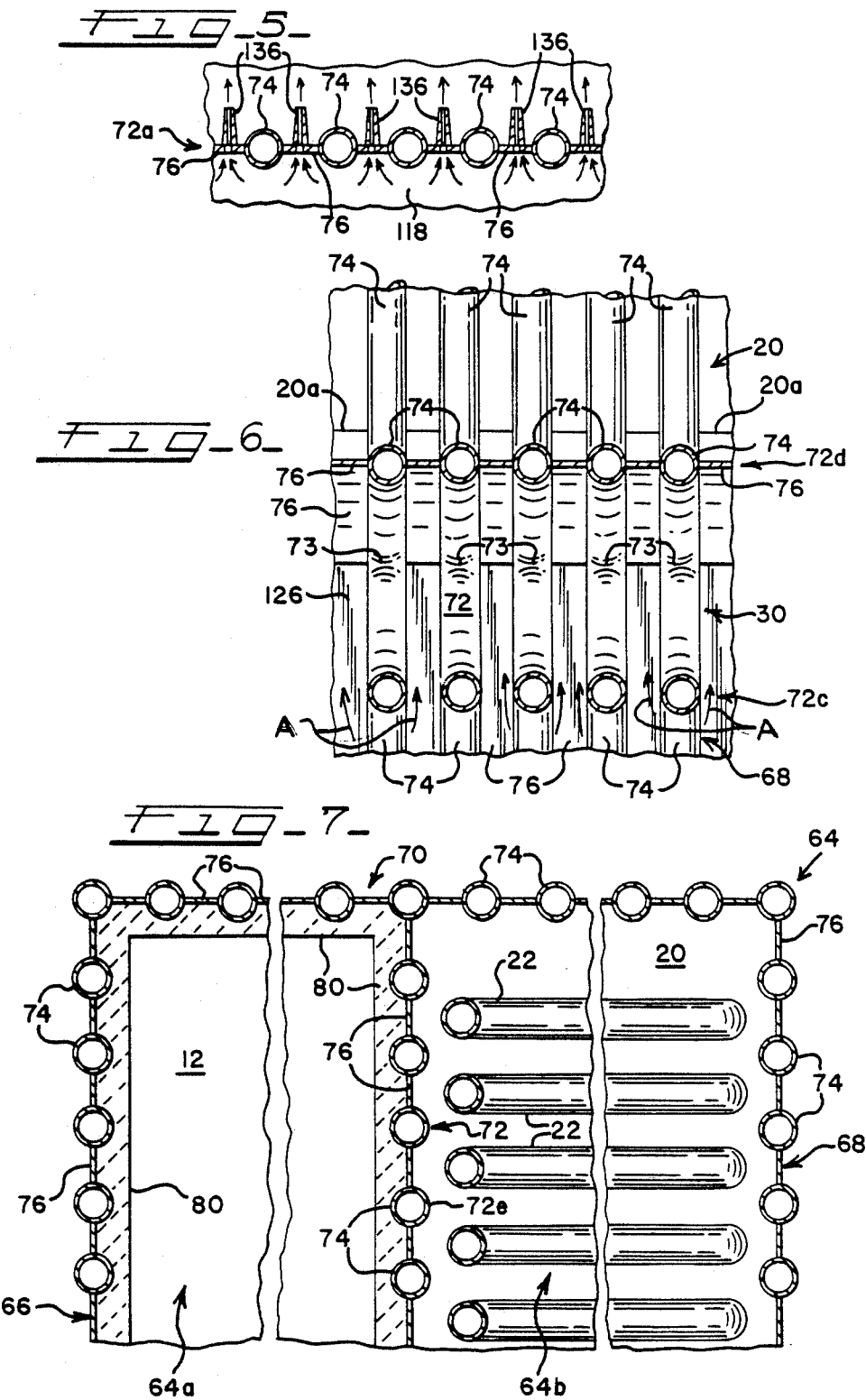

FLUIDIZED BED STEAM GENERATING SYSTEM

BACKGROUND OF THE INVENTION

1. Field of the Invention

The present invention relates to a new and improved fluidized bed steam generating system and more particularly to a system wherein a waterwall structure is provided to enclose an upstanding combustion vessel on one side and a convection pass boiler and heat exchanger on the other side of a common central waterwall.

2. Description of the Prior Art

U.S. Pat. Nos. 4,084,545 and 4,154,581 disclose fluidized bed systems wherein a reactor vessel is provided with a dense bed section including large size or coarse solid particulate material maintained in a fluidized condition while a flow of fine solid particulate material in a highly fluidized state is recirculated through the vessel between a gas/solids separator and an external heat exchanger. Hot gaseous products of combustion are taken from the gas/solids separator and utilized for heating boiler tubes in a convection pass boiler to generate steam. Problems have developed in systems of the type described in the aforementioned patents because of the separation and spaced-apart location of the various major components of the system. Also, the use of refractory materials has greatly impacted on component weights, and has affected maintenance procedures and schedules for completing and maintaining an operative system, causing it to be generally desirable to minimize the amount of refractory material used. Another problem associated with systems of the type described is the problem of differential thermal movement between component parts, in particular where refractory lined flow conduits are provided. Moreover, long or crooked horizontally extending conduits for recycling the fine solid particulates have presented operational problems resulting in uneven distribution and flow in the reactor vessel of the system. Poor air distribution and gaseous interaction with entrained solids has caused combustion and temperature distribution problems and these problems have resulted in reduced steam output capacities and reduced thermal heat transfer efficiency. Other problems have occurred in external heat exchangers having sparger type fluidized bed air distributors and fuel feeding problems have also been encountered. Sometimes pneumatic lift lines have been employed and these have incurred problems from both a mechanical and a physical arrangement standpoint and problems with internal flow distribution due to interactions between the transport air flow and the recycled fine solid materials have also occurred.

OBJECTS OF THE PRESENT INVENTION

It is an object of the present invention to provide a new and improved fluidized bed steam generating system and more particularly a new and improved system which eliminates or minimizes problems associated with prior art systems as heretofore mentioned.

Yet another object of the present invention is to provide a new and improved fluidized bed steam generating system which employs a minimum amount of refractory material and which utilizes waterwall structures for conserving and efficiently obtaining heat transfer from the combustion process for the generation of steam.

Yet another object of the present invention is to provide a new and improved fluidized bed combustion system wherein major components of the system including a combustion reactor, a convection pass boiler and a heat exchanger are contained within a unitary waterwall structure.

More particularly, it is an object of the present invention to provide a new and improved heat generating system of the character described wherein a containing unitary waterwall structure is divided into first and second chambers by a common central waterwall so that a combustion vessel is efficiently contained in one chamber and a convection pass boiler and heat exchanger are contained in the other chamber.

Still another object of the present invention is to provide a new and improved fluidized bed steam generating system wherein a heat exchanger is positioned directly below a convection pass boiler enclosed in one chamber of a waterwall structure and wherein an outlet thereof is provided for discharging recirculating fine solids directly into a combustion reactor vessel contained in an alternate chamber of the waterwall structure.

Another object of the present invention is to provide a new and improved fluidized bed heat generating system of the character described having a heat exchanger provided with an intermediate, waterwall, bottom structure for extracting heat from the recirculating fine solid particulate material.

Another object of the present invention is to provide a new and improved fluidized bed steam generating system requiring a minimum cost and a minimum space per unit of heat generating capacity and wherein operating problems of prior art systems are minimized or eliminated altogether.

BRIEF SUMMARY OF THE PRESENT INVENTION

The foregoing and other objects and advantages of the present invention are accomplished in a preferred embodiment comprising a fluidized bed steam generation system including an upright combustion reactor vessel, a gas/solids separator, a convection pass boiler and a heat exchanger positioned directly below the boiler. A waterwall enclosure is provided to encase the reactor vessel, the convection pass boiler and the heat exchanger and the waterwall structure includes a centrally disposed waterwall which forms a common dividing wall between the separate chambers in the structure. One of the chambers is adapted to encase the upright reactor vessel and the second chamber encloses the convection pass boiler and the interal heat exchanger directly therebelow.

A refractory lined duct is adapted to direct the output of hot gases and recirculating solid fine particulate material from the combustion reactor vessel into a tangential inlet of one or more gas/solids separators wherein the solid material is centrifuged out and is eventually returned to the heat exchanger or directly into the combustion reactor vessel. Hot gases from the gas/solids separator are directed downwardly into the upper end of the convection pass boiler to provide heat for generating steam in the waterwall and in a super-heater coil mounted in the convection pass boiler. Recirculating hot solid fine particulate material is fluidized in the heat exchanger and gives up heat to a coil therein before traveling upwardly through openings between water tubes in the intermediate waterwall to pass directly into the combustion vessel.

Only the combustion reactor vessel, the gas/solids separators, the transfer ducts therebetween and a hot gas outlet duct from the gas/solids separators leading to the upper end of the convection pass boiler are provided with refractory lining material. The heat exchanger is provided with an intermediate waterwall bottom dividing the chamber to provide an upper section for containing recirculating fine solid material and enclosing a steam generation coil. A lower gas/air plenum chamber is formed beneath the bottom wall for containing a supply of gas/air for fluidizing the fines in the upper section of the heat exchanger to pass directly into the combustion reactor vessel at a level adjacent the oxidizing zone. The common waterwall structure which encases the major components of the steam generation system provides an efficient means for generating steam from the combustion process and at the same time permits individual components in the system to be closely positioned relative to one another so as to minimize thermal, problems caused by remotely located components and other problems common in the prior art.

BRIEF DESCRIPTION OF THE DRAWINGS

For a better understanding of the present invention reference should be had to the following detailed description taken in conjunction with the drawings, in which:

FIG. 2 is a front elevational view of the system of FIG. 1 looking generally in the direction of arrows 2—2 with portions cut away and in section for clarity;

FIG. 3 is a top plan view of the system;

FIG. 4 is an enlarged fragmentary sectional elevational view of the heat exchanger component of the steam generating system;

FIG. 5 is an enlarged, fragmentary cross-sectional view taken substantially along lines 5—5 of FIG. 4;

FIG. 6 is an enlarged fragmentary cross-sectional view taken substantially along lines 6—6 of FIG. 4; and FIG. 7 is an enlarged fragmentary horizontal cross-sectional view taken substantially along lines 7—7 of FIG. 1.

DETAILED DESCRIPTION OF A PREFERRED EMBODIMENT

Figure 1:
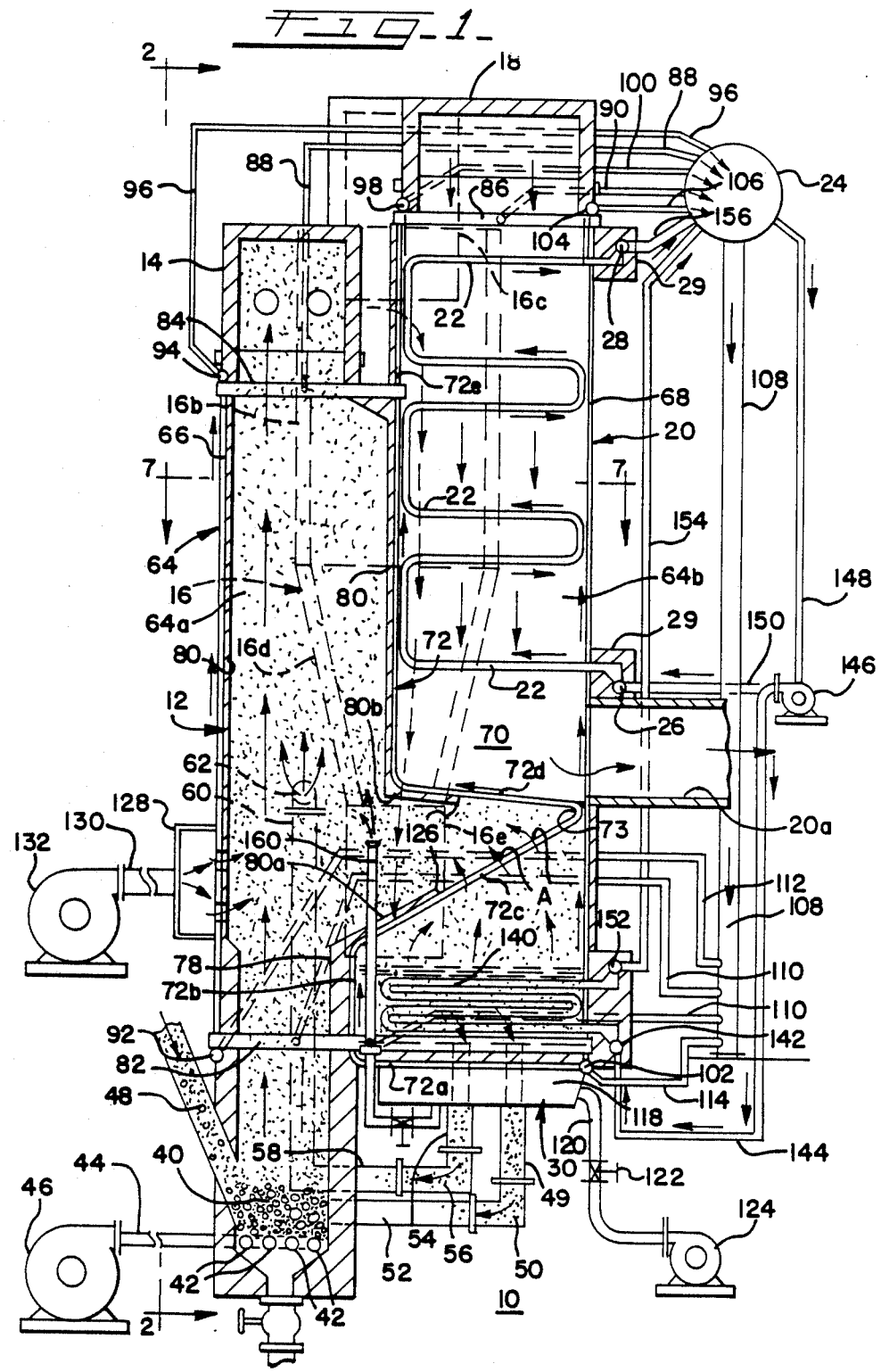
FIG. 1 is an elevational, cross-sectional view of a new and improved steam generating system constructed in accordance with the features of the present invention.

Referring now more particularly to the drawings, therein is illustrated a new and improved multisolid fluidized bed steam generating system 10 constructed in accordance with the features of the present invention. The steam generating system includes an upstanding elongated combustion reactor vessel 12 for containing a recirculating flow of fine solid particulate material such as sand or the like used for absorbing heat generated in the combustion process taking place in the vessel during operation. The general direction of flow in the combustion vessel is upwardly and at the upper end or top, the vessel is provided with an outlet in communication with a refractory lined duct 14 having opposed transfer branches 14a and 14b (FIG. 3) for directing a flow of hot combustion gases and recirculating fine particulate material into a pair of tangentially aligned inlets 16a on a pair of refractory lined centrifugal cyclone separators 16.

Each cyclone type separator includes a cylindrical main body portion 16b wherein centrifuging action takes place to separate the gas from the solid particulate material. Hot gases are discharged upwardly through cylindrical outlet ducts 16c into a common refractory lined manifold 18 and the fine solid particulate material that is centrifuged out of suspension falls downwardly into a lower, frustoconically shaped section 16d having a discharge chute 16e at the lower end.

Hot gases in the manifold 18 are directed downwardly into the upper end of a convection pass boiler 20 having an outlet duct 20a at the lower end for directing the gases outwardly toward an economizer and/or exhaust gas cleansing apparatus such as a bag house, wet scrubbers or electrostatic precipitators before the gas is finally discharged into the atmosphere in a cleansed and cooled condition.

As the hot gases flow downwardly in the convection pass boiler 20 heat is given up to steam or water flowing in banks of internal boiler tubes 22, some of which tubes may function as a superheater for generating superheated steam from saturated steam received from a steam drum 24 and/or evaporating steam from water. The banks of boiler tubes 22 are connected to a lower supply header 26 and at the upper end to an upper collection header 28 and these headers are mounted in insulating enclosures 29 externally of the convection pass boiler 20.

Directly below the convection pass boiler, the system 10 is provided with a heat exchanger 30 for extracting heat from recirculating hot, fine particulate materials before the materials move back into the combustion reactor vessel for upward flow along with the combustion gases and fines moving upwardly therein. As shown in FIG. 2, hot recirculating fine particulates separated in the cyclones 16 fall downwardly from the solids discharge outlets 16e into a pair of laterally inwardly directed feeders 32 having discharge outlets on opposite sides of the main body portion of a lower segment of the heat exchanger 30.

Some of the hot fine particulate material reaching the feeders 32 is discharged directly from conduits 34 into L-valve flow controllers 36 preferably of the type disclosed in copending U.S. Pat. application Ser. No. 939,819, filed Dec. 9, 1986 which application is assigned to the same assignee as the present invention. Each of the L-valve flow regulators 36 includes a standpipe or vertical leg and horizontal output leg 38 of relatively short length having discharge end in direct communication with the reactor vessel 12 at a lower level whereat a dense bed section 40 of relatively large size particulate material is maintained in a fluidized state.

Fluidizing gas for the dense bed is provided by a plurality of gas injectors 42 supplied by a manifold 44 connected to a suitable source of pressurized air or gas such as a fan or blower 46. Primary combustion air is provided by the air injectors and this primary air maintains the permanent, relatively large size or coarse solid particulate material in a fluidized state within the dense bed section 40.

Recirculating fine solid material is injected into the dense bed section 40 from the outlet ducts 38 of the L-valve flow regulators 36 and intermixes with the fluidized large sized particulates which maintain a permanent residence in the dense bed section and are not entrained upwardly with the upward gas flow as are the small size recirculating fines. Fuel for the combustion process taking place in the reactor vessel 12 is supplied through one or more downwardly extending sloping fuel injector conduits 48. In many installations the fuel comprises solid particulates such as crushed coal and natural gas or oil may also be used. Additives such as crushed limestone and the like are sometimes provided for reacting with sulphur and other unwanted impurities in the fuel.

As the fuel is burned in the lower end of the reactor vessel, the heat developed by combustion is absorbed in the hot recirculating fine particulate material to maintain a stable temperature. A reducing zone is formed in the lower end portion of the reactor vessel 12 and extremely high temperatures are not developed because the heat generated is absorbed by the recirculating fine particulates.

Additional hot fine particulates are recycled into the combustion vessel 12 from the heat exchanger 30 through downcomer conduits 49 which supply L-valve flow regulators 50 with material for injection into the dense bed section 40 of the reactor vessel via short length horizontal input ducts 52. Additional hot fines are recycled from the heat exchanger 30 through downcomers 54 connected to L-valves 56 for supplying a controlled flow rate of recirculating fine particulate material to short horizontal ducts 58. The ducts 58 are connected to vertically upstanding conduits 60 having discharge elbows 62 at the upper end for directing a flow of recirculating hot fines into the combustion reactor vessel 12 at an elevated level therein in an oxidizing region in the upward flow above the dense bed section 40.

In accordance with an important feature of the present invention, the combustion reactor vessel 12, the convection pass boiler 20 and the heat exchanger 30 are contained within an upstanding, generally rectangular shaped waterwall structure 64 shown in horizontal cross-section in FIG. 7 and provided with a finned tube, front wall panel 66, a parallel back wall panel 68 and a pair of opposite side walls 70 normal thereto and joining the front and back wall at the corners as shown. Approximately mid-way between the front and back walls 66 and 68 is provided a common divider wall 72 which divides the waterwall enclosure 64 into a pair of upstanding compartments 64a and 64b. The compartment 64a is designed to enclose the upstanding combustion reactor vessel 12 and the compartment 64b is adapted to enclose the convection pass boiler 20 and the heat exchanger 30 spaced directed thereunder.

As illustrated best in FIG. 7, each of the waterwall panels 66, 68, 70 and 72 is formed by a plurality of spaced apart, parallel hollow water or steam tubes 74 which are in turn separated and interconnected by fins 76 in a customary finned tube type wall construction. Because of the relatively high temperatures developed in the combustion reactor vessel 12, a lower portion thereof inside the waterwall structure 64 is lined with refractory lining material 78 of suitable thickness to handle the temperatures developed and an upper portion of the combustion reactor vessel is handled with a somewhat thinner refractory wall liner material 80. As illustrated, a layer of refractory material 80 is also provided adjacent the common divider waterwall 72 between the separate compartments 64a and 64b of the waterwall structure. In the chamber 64b which contains the convection pass boiler 20 and the heat exchanger 30, no refractory liner is provided because of somewhat reduced temperatures and abrasive characteristics of the flow contained therein.

At the lower end, each of the waterwall side panels 70 is provided with a fluid feeding header 82 and a pair of headers 84 and 86 are provided at the upper end portion of the waterwall side panels to collect the heated water and steam generated as the fluid moves through the waterwall panels. Heated water and steam from the upper side header 84 is directed into the steam drum 24 through a pair of lines 88 and in similar fashion, the heated fluid and steam generated and collected in the header 86 is directed into the steam drum through conduits 90.

A supply header 92 is provided at the lower end of the front waterwall panel 66 and an upper collection header 94 is provided at the upper end of the panel to supply heated fluid and steam collected from the panel to the drum 24 via a conduit 96. A similar upper collection header 98 is provided at the upper end of the intermediate or common waterwall panel 72 between the compartments 64a and 64b of the waterwall structure 64 and the water and steam collected in the header 98 is delivered to the steam drum 24 through a collection conduit 100. The rear wall 68 of the waterwall structure 64 is provided with a lower supply header 102 and an upper collection header 104 at the upper end which returns heated fluid and steam to the steam drum 24 via a collection conduit 106. The rear lower header 102 also supplies the fluid to the lower end of the intermediate or dividing waterwall panel 72 which will be described in more detail in connection with the heat exchanger 30. Fluid to be heated from the drum 24 is carried downwardly by a pair of large downcomer pipes 108 which are connected to supply the respective lower headers 82, 92 and 102 by interconnecting supply conduits 110, 112 and 114, respectively. Additional downcomers 116 may be provided as necessary to supply feed water to other components of the system.

As best shown in FIGS. 1 and 4, the intermediate or dividing waterwall panel 72 includes a lower horizontal segment 72a which forms an intermediate bottom wall of the heat exchanger 30 above a lower air plenum chamber 118. The plenum chamber is provided with a supply of fluidizing air through an inlet air duct 120 and flow control valve 122. The inlet duct 120 is connected to a suitable source of compressed air or gas such as a blower 124. After fluid supplied by the lower header 102 passes through the intermediate horizontal wall section 72a, it is directed upwardly in a short vertical segment 72b adjacent the thickened refractory wall section 78 of the combustion reactor vessel 12 as shown in FIG. 4. From the short vertical wall segment 72b, the intermediate common waterwall 72 slopes upwardly and outwardly in a segment or portion 72c towards the rear waterwall panel 68 whereat a reverse bend 73 is provided in the tubes 74 and the direction of flow is reversed to flow inwardly and upwardly in a sloping waterwall section 72d which separates the upper portion of the heat exchanger 30 from the lower end of the convection pass boiler 20.

Referring specifically to FIGS. 4 and 6, a short sloping segment of thin refractory wall material 88 is provided above the sloping waterwall segment 72c and defines an outlet opening 126 between the upper portion of the heat exchanger 30 and an intermediate portion of the combustion reactor vessel 12 at an oxidizing zone or level therein. As shown in FIG. 6, segments of the fins 76 between the tubes 74 are removed from a point at the upper end of the sloping refractory material 80a to the reverse bends 73 of the tubes so as to permit an upward flow of fluidized recirculating fine particulate material between the tubes as indicated by the arrows A. This flow moves from the upper portion of the heat exchanger 30 through the inlet 126 defined between the upper edge of the refractory segment 80a and the lower edge of a short refractory segment 80b fixed below the sloping waterwall panel segment 72d as shown in FIG. 4.

It should also be noted as best shown in FIG. 2, that the fins 76 between individual water tubes 74 of the sloping waterwall section 72c are removed to a point just below the starting of the reverse bend areas 73 of the tubes 74 but that a continuous wall of finned tubes is provided across the lower end of the convection pass boiler 20 by the sloping waterwall panel section 72d to separate the flowing medium in the heat exchanger 30 from the flow in the convection pass boiler 20 directly thereabove. Water and steam flowing through the reverse bends 73 of the tubes 74 in the waterwall section 72d then flows upwardly in a main vertical section 72e of the divider wall 72 which forms the division between compartments or chamber 64a and 64b of the rectangular waterwall structure 64.

As viewed in FIG. 2, it can be seen that the large opening 126 between the heat exchanger 30 and the combustion reactor vessel 12 extends across the entire width of both of the respective vessels between the side walls 70 and accordingly excellent intermixing of the recirculating fine particulate material from the external heat exchanger into the upwardly flowing gases and particulates in the main combustion reactor vessel is achieved. Moreover, the opening 126 is positioned at a level which is in the oxidizing zone of the combustion reactor vessel so that the somewhat cooled fine recirculating particulates are available ready to absorb the large quantities of heat that are generated as the oxidation process takes place.

Directly opposite of the opening 126 on the front wall 66 of the structure there is provided a secondary air plenum chamber 128 for directing a flow of secondary fluidizing and combustion air from a duct 130 through inlets in the waterwall 66 and refractory wall 80 to intermix the secondary air with the upwardly flowing gases and particulates in the combustion vessel. The secondary plenum 128 is supplied through the inlet duct 130 which is connected to a suitable source of pressurized air or gas such as a blower 132.

Recirculating fine particulate materials received from the lower section 16e of the respective cyclone separators 16 are directed laterally inwardly into the central section of the heat exchanger 30 above the level of the intermediate, heat exchanger floor 72a by means of fluid injectors 134 (FIG. 2) which provide fluidizing air for moving and carrying the particulates into the central portion of the heat exchanger immediately above the intermediate bottom wall 72a. Further fluidizing air is provided by a plurality of small upwardly extending nozzles 136 having lower inlets in communication with the air plenum chamber 118 and upper outlet ends adapted to direct fluidizing air upwardly from the fin segments 76 over substantially the entire area of the intermediate bottom wall 72a. This injected air maintains the recirculating hot fine material in fluidized suspension and eventually carries the material upwardly through the openings between the tubes 74 in the wall panel water tube segment 72c and eventually into the combustion reactor vessel 12 through the opening 126 as previously described.

Because the hot particulate material returned to the system for recycling from the cyclone separators 16 is at a substantially high temperature in the order of approximately 1600°, heat is given up by the particulate material to the adjacent waterwall sections 72a, 72b, 72c and 72d. In addition, a main heat exchanger coil 140 is positioned in the body of the heat exchanger enclosure immediately above the intermediate bottom wall 72a and below the normal upper level of fluidized fine particulate material contained in the heat exchanger. A major portion of the heat developed in the combustion system is transferred to the fluid passing through the heat exchanger 140 which is supplied with water from a lower header 142 which in turn is supplied from the steam drum 24 either via the downcomers 116 or a supply conduit 144. The conduit 144 is connected to a circulating water pump 146 supplied from the drum via a downcomer 148. The water circulating pump 146 may also be used to provide feed water to the convection pass tubes 26 by a supply conduit 150. Water moving upwardly through the large heat exchanger coil 140 is collected eventually in an upper header 152 and directed upwardly via a conduit 154 to the steam drum. Similarly, water and steam collected in the upper header 28 of the convection pass coil 22 may be directed back to the steam drum 24 via a conduit 156. If a superheater coil is installed in the convection pass the steam will be directed outwardly to a superheated steam supply manifold for use in a variety of loads as needed.

In accordance with an important feature of the present invention, additional hot fine particulate material is recirculated from the lower levels of the heat exchanger 30 up to a higher level adjacent the oxidizing zone in the reactor vessel 12 through a plurality of vertically extending lift tubes 160 as best shown in FIG. 4. The lift tubes have an outlet end inside the main reactor vessel 12 at a level above the lower edge of the opening 126 so that the hot fine sand is recirculated directly into the flow in the combustion vessel at the oxidizing level. The body of the lift tubes extends downwardly through the refractory wall section 80a and between the tubes 74 of the waterwall panel section 72c. At the lower end, each lift tube is opened with an inlet mouth for receiving a Venturi-like flow of pressurized air from the plenum chamber 118. This air is directed upwardly through inlet nozzle structures 162 on the bottom wall 72a. Air is taken from the bottom of the plenum chamber 118 through conduits 164, and control valves 166 are provided for regulating the desired amount of air flow into the lower level of the fine solid particulates in the heat exchanger body just above the intermediate wall section 72a. By Venturi-like action, the fast moving air directed upwardly through the nozzle structures 162 entrains and picks up hot recirculating fines and carries these fines up the lift tubes 160 for discharge at an elevated level in the oxidizing zone of the combustion reactor vessel 12. This hot sand is effective at this level to rapidly absorb the heat of combustion developed in the combustion process and thus maintains excellent temperature control characteristics in the combustion process.

Although the present invention has been described in terms of a preferred embodiment, it is intended to include those equivalent structures, some of which may be apparent upon reading this description, and others that may be obvious after study and review.

What is claimed and sought to be secured by Letters Patent of the United States is:

1. A fluidized bed steam generating system, comprising;
an upstanding combustion vessel for containing a recirculating flow of fluid entrained, fine solid particulate material and a dense bed section of limited space in a lower portion of said vessel containing a fluidized, coarse solid particulate material retained in said limited space as said fine solid particulate material moves through said dense bed section, fuel injection means adjacent said dense bed section for introducing fuel for combustion, and fluidizing means for injecting combustion air and gas for fluidizing said dense bed section and entraining said fine solid particulate material to flow upwardly toward an outlet adjacent the upper end of said combustion vessel;
a gas/solid separator adjacent said combustion vessel having an inlet in communication with said outlet of said combustion vessel, an outlet for separated gas and an outlet for separated fine solid particulate material;
a convection pass boiler having an inlet for hot gas adjacent an upper end in communication with said outlet for separated gas of said gas/solid separator and an outlet for cooled gas adjacent a lower end, said boiler having an enclosure formed with a waterwall adjacent said combustion vessel and boiler tubes for receiving heat from said gases flowing downwardly from said hot gas inlet toward said cooled gas outlet; and
a heat exchanger directly below said boiler and adjacent said combustion vessel having an inlet in communication with said outlet for separated solids of said gas/solid separator and an outlet in communication with said combustion vessel for introducing said recirculating fine solid particulate material to flow upwardly therein, a fluidized bed of said fine solid particulate material maintained in said heat exchanger, a tubular heat exchange element in said bed for receiving heat therefrom, and fluid injector means for fluidizing said bed and recirculating said fine solid particulate material back into said combustion vessel.

2. The steam generating system of claim 1 including:
an upstanding waterwall structure having a first set of upwardly extending, waterwall panels defining opposite side walls of said combustion vessel, said boiler and said heat exchanger.

3. The steam generating system of claim 2, wherein:
said waterwall structure includes a second set of upwardly extending, waterwall panels normal to said first set of panels and extending therebetween to form a hollow enclosure for said combustion vessel, said boiler and said heat exchanger.

4. The steam generating system of claim 2 wherein:
said first mentioned waterwall of said boiler enclosure adjacent said combustion vessel is spaced between and parallel of said second set of waterwall panels and divides said structure into a first vertically extending chamber for said combustion vessel and a second vertically extending chamber for said boiler and said heat exchanger.

5. The steam generating system of claim 4 wherein:
said combustion vessel includes refractory wall liners adjacent said second set of said waterwall panels.

6. The steam generating system of claim 5, wherein:
said combustion vessel includes refractory wall liners adjacent one of said waterwall panels of said first set and said first mentioned waterwall.

7. The steam generating system of claim 6, wherein:
said outlet of said combustion vessel is defined adjacent an upper end of said refractory wall liners, and including refractory lined duct means for directing said fluid entrained flow of fine solid particulate material from said combustion vessel outlet to said inlet of said gas/solid separator.

8. The steam generating system of claim 7, wherein:
said gas/solid separator comprise a centrifugal cyclone type separator and said inlet therein is designed for directing said fluid entrained flow of fine solid particulate material inwardly in a direction tangentially of an upwardly extending outlet duct forming said outlet at the upper end thereof.

9. The steam generating system of claim 8, wherein:
said gas/solid separator comprises at least one centrifugal cyclone mounted on the side of said combustion vessel,
and refractory lined duct means connected between said outlet of said cyclone and said inlet at the upper end of said boiler for directing hot gases from said outlet downwardly into said boiler for heating fluid in said boiler tubes said first mentioned waterwall and said waterwall panels.

10. The steam generating system of claim 4, wherein:
said first mentioned waterwall includes a first sloping section providing a dividing wall in said second vertical chamber between said heat exchanger and said boiler.

11. The steam generating system of claim 10, wherein:
said first mentioned waterwall includes a second sloping section in communication with a lower end portion of said first sloping section and including a plurality of openings for passing a flow of fluid entrained recirculating fine solid particulate material from the fluidized bed of said heat exchanger into said combustion vessel.

12. The steam generating system of claim 11, wherein:
said first mentioned waterwall includes a plurality of spaced apart hollow tubes for containing a flow of fluid to be heated and a plurality of metal fins interconnecting adjacent tubes to form said water-wall.

13. The steam generating system of claim 12, wherein:
said openings in said second sloping section comprise space between said tubes wherein said fins are not present.

14. The steam generating system of claim 4, wherein:
said structure includes a plurality of upper and lower headers for supplying and receiving fluid to be heated in said waterwall panels and said first mentioned waterwall of said first and second chambers.

15. The steam generating system of claim 14, including:
a steam drum adjacent an upper end portion of said combustion vessel for collecting steam generated in said waterwall panels of said structure and said first mentioned waterwall.

16. The steam generating system of claim 15, including:
fluid conduit means for interconnecting said steam drum with said upper and lower headers for circulating fluid through said waterwall panels and said first mentioned waterwall.

17. The steam generating system of claim 16, including:
fluid conduit means for interconnecting said steam drum with said boiler tubes of said boiler for producing steam from heat supplied in said convection pass.

18. The steam generating system of claim 15, including:
fluid conduit means for interconnecting said steam drum with said tubular heat exchange element of said heat exchanger.

19. The steam generating system of claim 10, wherein:
said heat exchanger includes a lower plenum chamber for receiving fluidizing gas from said fluid injector means, and
an intermediate bottom wall above said plenum chamber comprising a waterwall connected to supply fluid to said first mentioned waterwall, and
nozzle means intermediate the tubes of said intermediate bottom wall for directing fluidizing gas upwardly to fluidize said fine solid particulate materials for recirculation into said combustion vessel.

20. The steam generating system of claim 19, including:
lift tube means extending upwardly of said intermediate bottom wall of said heat exchanger and supplied with pressurized gas from said plenum chamber for lifting said fine solid particulate material upwardly for discharge at an outlet positioned at an elevated level in said combustion vessel.

21. The steam generating system of claim 20, wherein:
said combustion vessel includes a lower reducing zone and an oxidizing zone above said reducing zone, said outlet of said lift tube means being positioned at a level to discharge said fine solid particulate materials into said oxidizing zone of said combustion vessel.

22. The steam generating system of claim 11, wherein:
said outlet of said heat exchanger extends between said second set of waterwall panels at a level between said first and second sloping sections of said first mentioned waterwall.

23. The steam generating system of claim 22, wherein:
said lift tube means comprises a plurality of lift tubes spaced apart across said outlet of said heat exchanger, each of said lift tubes having a lower inlet end spaced upwardly of said intermediate bottom wall of said heat exchanger, and a fluid injector nozzle extending upwardly toward said inlet of each lift tube supplied with gas from said plenum chamber for carrying said fine solid particulate material upwardly in said tube for discharge toward said oxidizing zone in said reactor vessel.

24. The steam generating system of claim 23, including:
valve means for controlling the flow rate of gas from said plenum chamber into each of said lift tubes for regulating the flow of said fine solid particulate material into said oxidizing zone from said heat exchanger.

25. The steam generating system of claim 1 including:
flow controlling valve means for controlling a fractional flow of recirculating solid fine particulate material received from said fines outlet of said gas/solid separator for discharge directly back to said combustion vessel independent of said heat exchanger.

26. The steam generating system of claim 1, including:
flow controlling valve means for controlling a fractional flow of recirculating solid fine particulate material received in said heat exchanger for discharge directly back to combustion vessel independent of said outlet of said heat exchanger.

27. The steam generating system of claim 26, wherein:
said valve means comprises at least one L-valve having an upstanding leg in communication with said heat exchanger and a discharge leg having an outlet in communication with said combustion vessel at said dense bed section.

28. The steam generating system of claim 26, wherein:
said valve means comprises at least one L-valve having an upstanding leg in communication with said heat exchanger and a discharge leg in communication with said combustion vessel having an outlet end adjacent said combustion zone.

29. The steam generating system of claim 26, wherein:
said outlet of said heat exchanger extends transversely across said combustion vessel between opposite side thereof at a level above said dense bed section.

30. The steam generating system of claim 9, including a plurality of said centrifugal cyclones mounted on opposite sides of said combustion vessel.

* * * * *